(12) United States Patent
Van Dyke et al.

(10) Patent No.: US 7,887,061 B2
(45) Date of Patent: Feb. 15, 2011

(54) METAL FACE SEAL ASSEMBLY AND MACHINE USING SAME

(75) Inventors: Bryan Van Dyke, Mt. Zion, IL (US);
Timothy M. Waters, Peoria, IL (US);
Timothy A. Thorson, Morton, IL (US);
Kevin Nemec, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 640 days.

(21) Appl. No.: 11/901,219

(22) Filed: Sep. 14, 2007

(65) Prior Publication Data

US 2009/0074601 A1    Mar. 19, 2009

(51) Int. Cl.
*F16J 15/34* (2006.01)

(52) U.S. Cl. ........................... 277/382; 277/384

(58) Field of Classification Search ......... 277/370–371, 277/377, 380–382, 384–387
See application file for complete search history.

(56) References Cited

U.S. PATENT DOCUMENTS

| | | | |
|---|---|---|---|
| 2,404,690 A * | 7/1946 | Caserta | 277/392 |
| 3,588,128 A * | 6/1971 | Petersen | 277/384 |
| 3,614,113 A | 10/1971 | Burk | |
| 3,946,859 A | 3/1976 | Jeffrey et al. | |
| 3,978,935 A | 9/1976 | Dauwalder | |
| 3,985,366 A | 10/1976 | Plouzek | |
| 4,077,634 A | 3/1978 | Durham | |
| 4,216,973 A | 8/1980 | Kessinger, Jr. | |
| 4,327,921 A | 5/1982 | Reinsma et al. | |
| 4,392,657 A | 7/1983 | Roley | |
| 4,428,588 A | 1/1984 | Oelke | |
| 4,514,014 A | 4/1985 | Balzer et al. | |
| 5,094,466 A * | 3/1992 | Baker et al. | 277/384 |
| 5,571,268 A * | 11/1996 | Azibert | 277/382 |
| 5,875,861 A * | 3/1999 | Daly et al. | 175/371 |
| 6,513,607 B2 | 2/2003 | Peterson et al. | |
| 6,550,588 B2 | 4/2003 | Hinton et al. | |
| 6,634,720 B2 | 10/2003 | Lopez | |
| 6,758,476 B2 * | 7/2004 | Takahashi | 277/370 |

* cited by examiner

*Primary Examiner*—Vishal Patel
(74) *Attorney, Agent, or Firm*—Liell & McNeil (57) ABSTRACT

A metal face seal assembly for sealing between machine components includes a first subassembly and a second subassembly rotatable relative to the first subassembly. Compressible seals positioned between inner and outer seal members of the subassemblies provide a non-axial sealing load, whereas at least one metallic biaser provides an axial face load to bias inner seal members of each subassembly together at a rotatable interface.

14 Claims, 5 Drawing Sheets

METAL FACE SEAL ASSEMBLY AND MACHINE USING SAME

TECHNICAL FIELD

The present disclosure relates generally to metal face seal assemblies for sealing between machine components, and relates more particularly to a metal face seal assembly wherein sealing and face loading functions of the seal assembly are performed by separate components.

BACKGROUND

A wide variety of seals for use in machine systems have been developed over the years. Seals are commonly used to retain lubricating fluid, such as oil or grease, within fluid cavities of machine system components. Where the machine system components are rotatable relative to one another, relatively sophisticated seal designs may be used to provide a fluid seal at a rotatable interface. One seal design which has seen much commercial success over the years is known in the art as a metal face seal. Metal face seals typically include inner seal members or "seal rings," which are each coupled with a separate machine component. The seal rings have abutting metal faces which can rotate relative to one another while sealing lubricating fluid within and/or among the associated machine components with minimal leakage.

One specific metal face seal design utilizes conical seal rings which include metal faces biased together via a biasing force generated by a compressible seal member, commonly referred to as a "toric" in reference to its generally toroidal shape. Outer seal members or "seal retainers" are typically positioned about the seal rings, with the torics compressed therebetween to provide a fluid seal between the respective inner and outer seal members. A conical shape of the seal rings allows compression of the torics to generate a biasing force to bias the faces of the seal rings together while simultaneously serving a sealing function between the respective inner and outer seal members. Metal face seals having this configuration can often be made with a relatively small number of parts without sacrificing efficacy. U.S. Pat. No. 6,550,588 to Hinton et al. discloses one example of a metal face seal having conical seal rings.

Despite widespread commercial success of the aforementioned type of seals, in at least certain applications there is room for improvement. On the one hand, it may be necessary to relatively highly compress the torics to ensure that they can continue to exert sufficient face loading on the seal rings as the torics lose some of their resiliency over time. This typically occurs due to relaxation of the toric material and/or decay. The relatively high initial compression, and therefore face loading, however, can reduce the capability of the seal to accommodate high rotational speeds. In other words, in a new seal assembly having relatively highly compressed torics, the faces of the seal rings may be biased together more tightly than is desired, resulting in relatively high friction between the seal rings and associated heat at high rotational speeds. Such seals also may be unable to accommodate much movement between the seal components due to the relatively highly compressed torics. Moreover, the conical components also tend to be relatively challenging to precisely machine.

The present disclosure is directed to one or more of the problems or shortcomings set forth above.

SUMMARY

In one aspect, the present disclosure provides a metal face seal assembly for sealing between components in a machine. The assembly includes a first subassembly including an inner seal member having a sealing face and an outer seal member positioned about and spaced from the inner seal member. The assembly further includes a second subassembly rotatable relative to the first subassembly and also including an inner seal member having a sealing face and an outer seal member positioned about and spaced from the respective inner seal member. The assembly still further includes a longitudinal axis. The subassemblies each further include a non-metallic compressible seal generating a sealing load in a non-axial direction to fluidly seal between the corresponding inner and outer seal members. The seal assembly also includes at least one metallic biaser separate from the compressible seals and generating a face load in an axial direction to bias the sealing faces of the inner seal members together at a rotatable interface.

In another aspect, the present disclosure provides a machine system that includes a first component and a second component rotatable relative to the first component. A metal face seal assembly is provided having a longitudinal axis and including a first subassembly coupled with the first component and a second subassembly coupled with the second component and rotatable relative to the first subassembly. The subassemblies each include an inner seal member having a sealing face and an outer seal member. The subassemblies also each include a non-metallic compressible seal positioned between their respective inner and outer seal members. The compressible seal generates a sealing load in a non-axial direction and fluidly seals between the inner and outer seal members. The seal assembly further includes at least one metallic biaser separate from the compressible seals and generating a face load in an axial direction biasing the sealing faces of the inner seal members together at a rotatable interface.

In still another aspect, the present disclosure provides a method of sealing between components in a machine system. The method includes a step of coupling first and second subassemblies of a metal face seal assembly with first and second machine components, respectively, the first and second machine components being rotatable relative to one another. The method further includes a step of generating a sealing load between inner and outer seal members of each of the first and second metal face seal subassemblies at least in part by compressing non-metallic compressible seals positioned between the inner and outer seal members. The method still further includes a step of generating a face load at a rotatable interface between sealing faces of each of the subassemblies at least in part by moving the inner and outer seal members of at least one of the subassemblies toward one another against a bias of a biaser separate from the compressible seal thereof and disposed between the inner and outer seal members of the corresponding subassembly.

DETAILED DESCRIPTION

Figure 1:
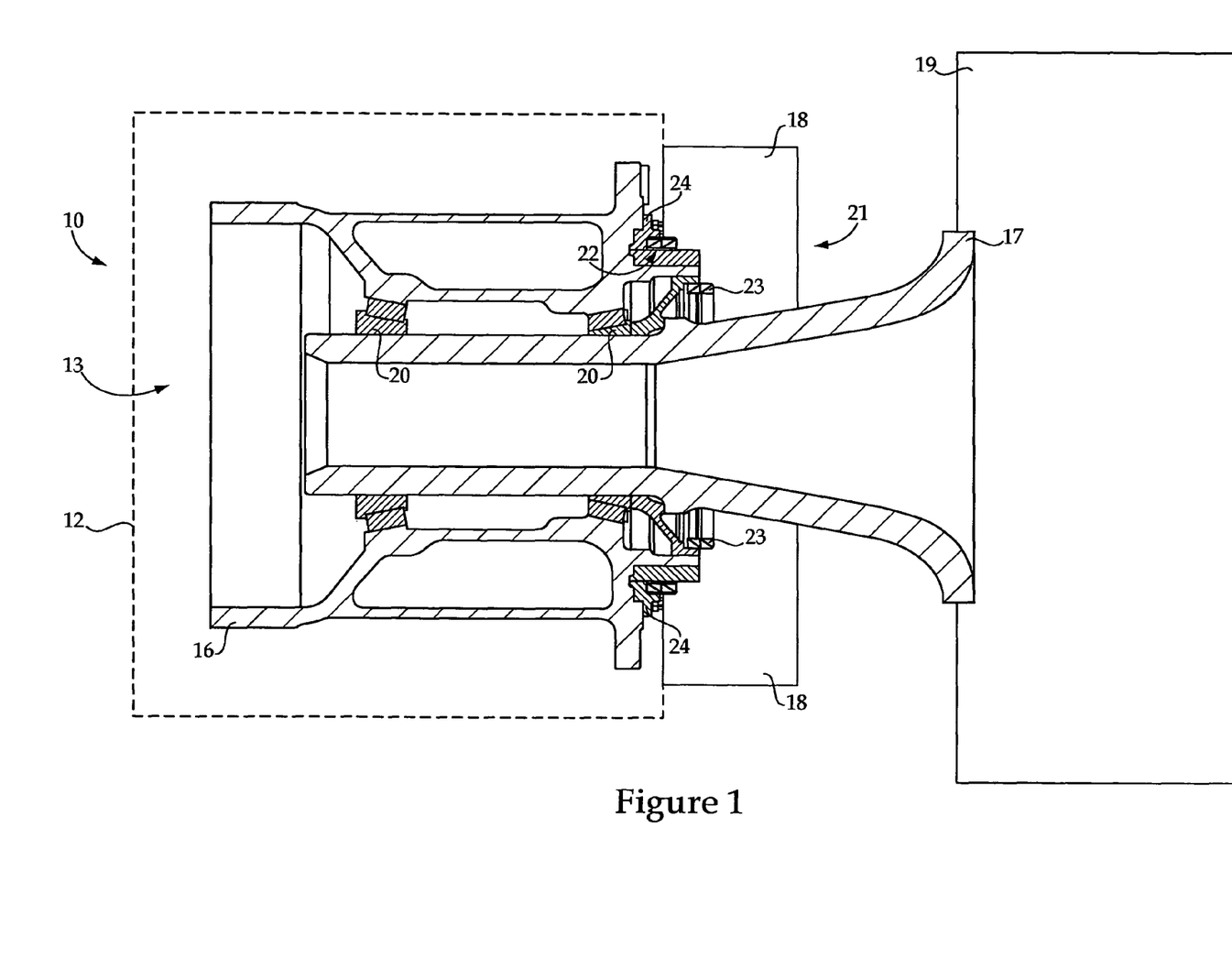
FIG. 1 is a partially sectioned side diagrammatic view of a machine according to one embodiment.

Referring to FIG. 1, there is shown a machine 10 according to one embodiment. Machine 10 includes a housing or frame 12 having a wheel assembly 13 coupled therewith. Wheel assembly 13 includes a hub 16 having a rotatable shaft portion 17 journaled therewith via bearings 20, and a wheel 19 coupled with rotatable shaft portion 17. Machine 10 is further shown as having a brake system 21 coupled with wheel assembly 13, and includes a metal face seal assembly 22 sealing between components 24 and 18, of brake system 21 and wheel assembly 13, respectively. Another seal assembly 23, which may be identical to or different from seal assembly 22, is also provided for sealing between components of machine 10. As will be apparent from the following description, seal assembly 22 has a configuration and operation providing advantages over known designs. While the present disclosure may be implemented in the context of a wheel assembly, it is not thereby limited. A wide variety of other applications are contemplated, including various components of track-type tractors such as track seals, track roller and carrier roller seals, final drive arrangements, auger drive/ support arrangements, and virtually any conceivable machine system wherein rotatable seal assemblies are desirable.

Figure 2:
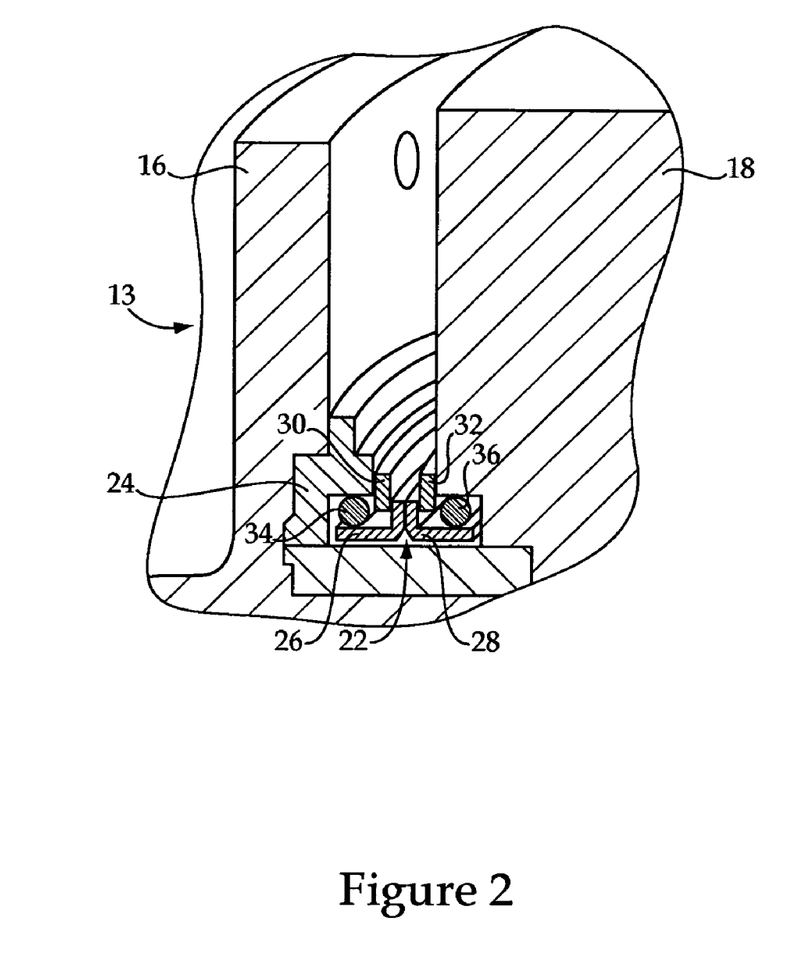
FIG. 2 is a sectioned side view, in perspective, of a portion of the machine of FIG. 1.

Turning now to FIG. 2, there is shown a portion of wheel assembly 13 illustrating seal assembly 22 in more detail. Seal assembly 22 may include a first inner seal member 26 and a second inner seal member 28. Components 16 and 18 may be rotatable relative to one another, with seal assembly 22 providing a means for fluidly sealing between components 16 and 18. Seal assembly 22 may also include first and second outer seal members each corresponding to one of inner seal members 26 and 28, respectively. In the illustrated embodiment, the first outer seal member comprises a part 24 coupled with component 16, whereas the second outer seal member is shown as component 18 itself. It should be appreciated that various machine system components and subcomponents might serve as the "outer" seal members.

Seal assembly 22 may further include a first toric 34 and a second toric 36. In one embodiment, torics 34 and 36 may consist wholly of a compressible non-metallic material such as an elastomeric or silicone material having a circular cross-sectional shape as shown. Torics 34 and 36 might, however, have alternative cross sectional shapes, such as a D-shaped, elliptical or oval cross-sectional shape, and might also be partially metallic. In some embodiments, a non-circular cross-sectional shape for torics 34 and 36 can enhance the ability of seal assembly 22 to tolerate fluid pressure spikes, as certain of such torics may have less of a tendency to dislodge. Seal assembly 22 may further include a first metallic biaser 30 and a second metallic biaser 32. In one embodiment, biasers 30 and 32 comprise one-piece annular metallic biasers such as traditional Belleville springs or wave springs. In other embodiments, multi-piece biasers, or some other configuration such as a circular, hard steel spring having cutouts to provide resiliency, commonly known as a "finger spring" might be used. Finger springs are generally understood as a type of Belleville spring, hence, the use of the term "Belleville" herein should be understood to encompass both traditional Belleville springs having generally circular inner and outer diameters, as well as variants such as finger springs. While biasers 30 and 32 may be formed wholly from a metal such as spring steel, in other embodiments they might be overmolded with an elastomeric material or the like. Regardless, the biasing function of biasers 30 and 32, as further described herein, will typically be at least predominately achieved via metal spring material.

Figure 3:
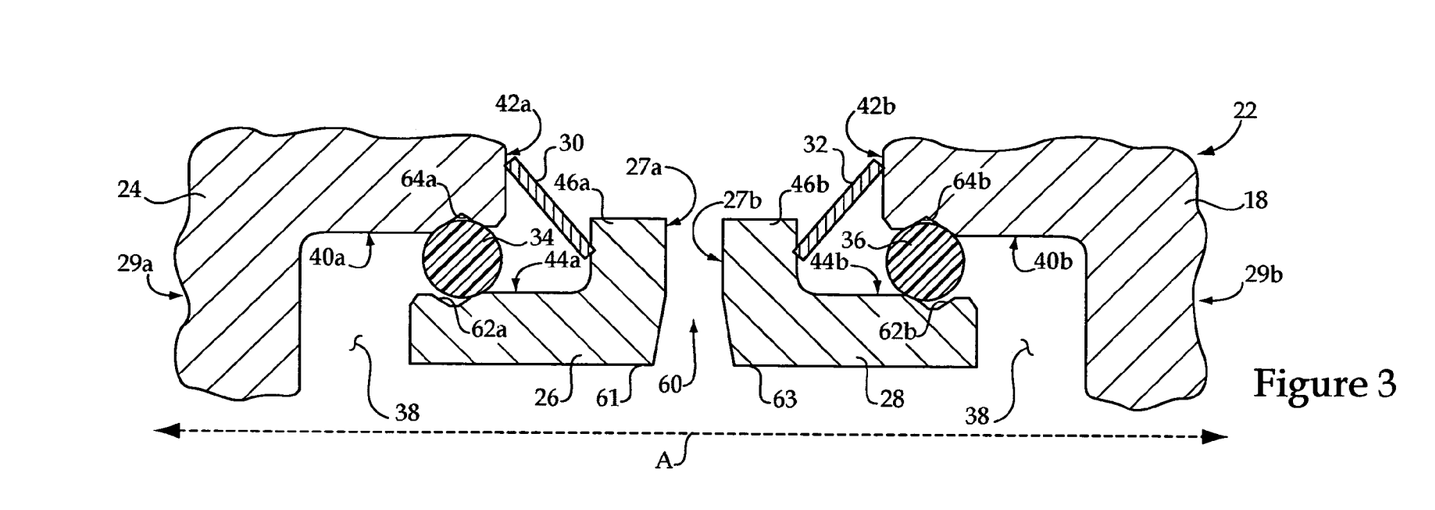
FIG. 3 is a sectioned side diagrammatic view of a portion of a metal face seal assembly according to one embodiment, in a first configuration.

Turning now to FIG. 3, there is shown a partial schematic view of seal assembly 22. Seal assembly 22 may be understood as having a first subassembly 29a comprising outer seal member 24, inner seal member 26, toric 34 and biaser 30. Seal assembly 22 also may include a second subassembly 29b that includes outer seal member 18, inner seal member 28, toric 36 and biaser 32. A longitudinal axis A common to each of subassemblies 29a and 29b is also shown. Each of inner seal members 26 and 28 may further include an outer diameter 44a and 44b, respectively, which may be a regular cylindrical outer diameter, and an annular shoulder 46a and 46b, respectively. A sealing face 27a and 27b is disposed at least predominately on each one of shoulders 46a and 46b, respectively. Each of inner seal members 26 and 28 further includes a bore 61 and 63, respectively, which are typically coaxial and through which shaft component 17 and other components of wheel assembly 13 and/or machine 10 can extend.

Each of outer seal members 24 and 18 may include an inner diameter 40a and 40b, respectively, for example a regular cylindrical inner diameter which is spaced from, concentric with, and extends parallel at least a portion of the outer diameter 44a and 44b of inner seal members 26 and 28, respectively. Each outer seal member 24 and 18 may further include an end face 42a and 42b, respectively. Each subassembly 29a and 29b may include at least one locating groove for its corresponding toric 34 and 36. Typically, each outer seal member 24 and 18 will include a locating groove 64a and 64b, and each inner seal member 26 and 28 will also include a locating groove 62a and 62b, the significance of which will be apparent from the following description.

Seal assembly 22 may further include all or a portion of one or more fluid cavities 38, extending between the inner and outer seal members of the respective subassemblies 29a and 29b, storing lubricating fluid for lubricating between faces 27a and 27b and for lubricating machine components associated with seal assembly 22. Seal assembly 22 is shown in a first, partially disassembled configuration in FIG. 3. In the configuration shown in FIG. 3, torics 34 and 36 are in a relatively uncompressed state, positioned between their corresponding inner and outer seal members. Biasers 30 and 32 are also in a relatively uncompressed state, positioned between the corresponding shoulder 46a and 46b and end face 42a and 42b, of the corresponding subassembly 29a and 29b. One purpose of torics 34 and 36 is to fluidly seal fluid cavity 38 when in a compressed state. To this end, torics 34 and 36 can be compressed by moving the inner and outer seal members of each one of subassemblies 29a and 29b axially toward one another, rolling torics 34 and 36 at least partially out of their respective locating grooves 62a, 64a and 62b, 64b.

Figure 4:
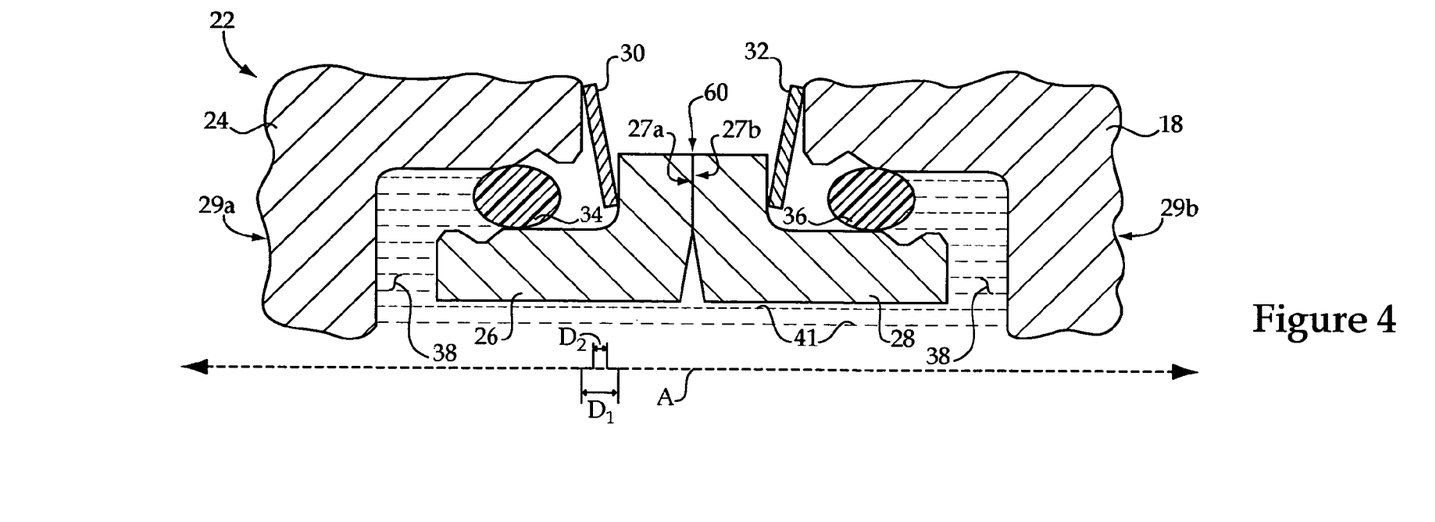
FIG. 4 is a sectioned side diagrammatic view of a portion of a metal face seal assembly according to one embodiment, in a second configuration.

Referring also to FIG. 4, there is shown seal assembly 22 in a second configuration wherein torics 34 and 36 are in a relatively compressed state, inner and outer seal member 26, 28 and 24, 18 having respectively been moved axially toward one another. In the configuration shown in FIG. 4, torics 34 and 36 exert a non-axial sealing load, typically oriented perpendicular axis A, to fluidly seal a lubricating fluid 41 in cavity 38. In FIG. 4, sealing faces 27b and 27a are shown abutting one another at a rotatable interface 60. In practice, a layer of lubricating fluid 41 will lie between sealing faces 27b and 27a, supplied via cavity 38, prior to or upon application of seal assembly 22 in a machine environment.

FIG. 4 also illustrates biasers 30 and 32 in a relatively more compressed state, also as may occur upon moving inner and outer seal members 26, 28 and 24, 18, respectively axially toward one another. When biasers 30 and 32 are compressed as shown, they can generate an axial face load on their corresponding inner seal members 26 and 28, to bias sealing faces 27a and 27b together. In one embodiment, a single step of moving subassemblies 29a and 29b axially toward one another can bring sealing faces 27a and 27b together, roll torics 34 and 36 into a relatively more compressed state, and compress biasers 30 and 32. In other embodiments, these actions might take place in separate steps. Some means for maintaining seal assembly 22 in a configuration similar to that shown in FIG. 4 will typically be used, such as by bolting components of wheel assembly together, in a manner familiar to those skilled in the art. When assembled in this manner, one of subassemblies 29a and 29b may be fixed to rotate with shaft component 17 and wheel 19, and the other fixed relative to hub 16.

Figure 5:
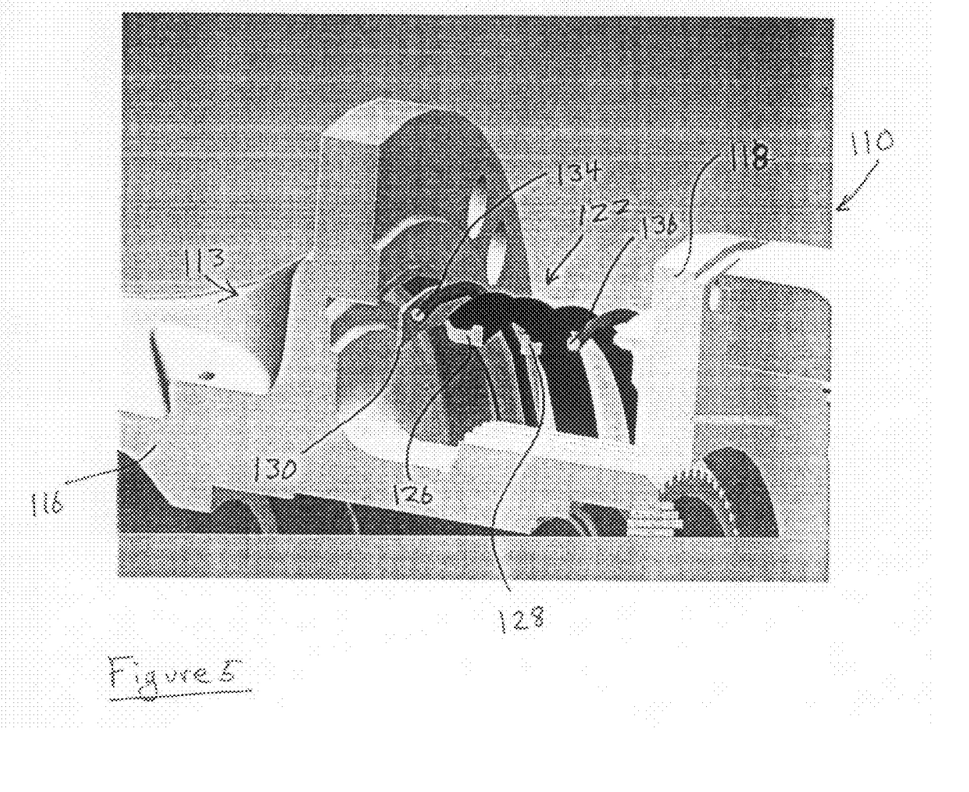
FIG. 5 is a partial sectioned diagrammatic view of a machine system, according to one embodiment.

Referring now to FIG. 5, there is shown a portion of a machine 110 which may be similar to machine 10 of FIG. 1, but having several differences. Machine 110 includes a wheel assembly having a first component 116 and a second component 118 rotatable relative to component 116. A metal face seal assembly 122 provides a rotatable fluid seal between components 116 and 118 in a manner similar to that of the foregoing embodiments. In contrast to seal assembly 22, described above, seal assembly 122 utilizes a single biasing member 130, which may be a Belleville spring, but could also be a different type of biaser such as a wave spring, finger spring, etc., as described above. Seal assembly 122 further includes a first inner seal member 126 and a second inner seal member 128, and a first and second toric 134 and 136, respectively, associated therewith.

Figure 6:
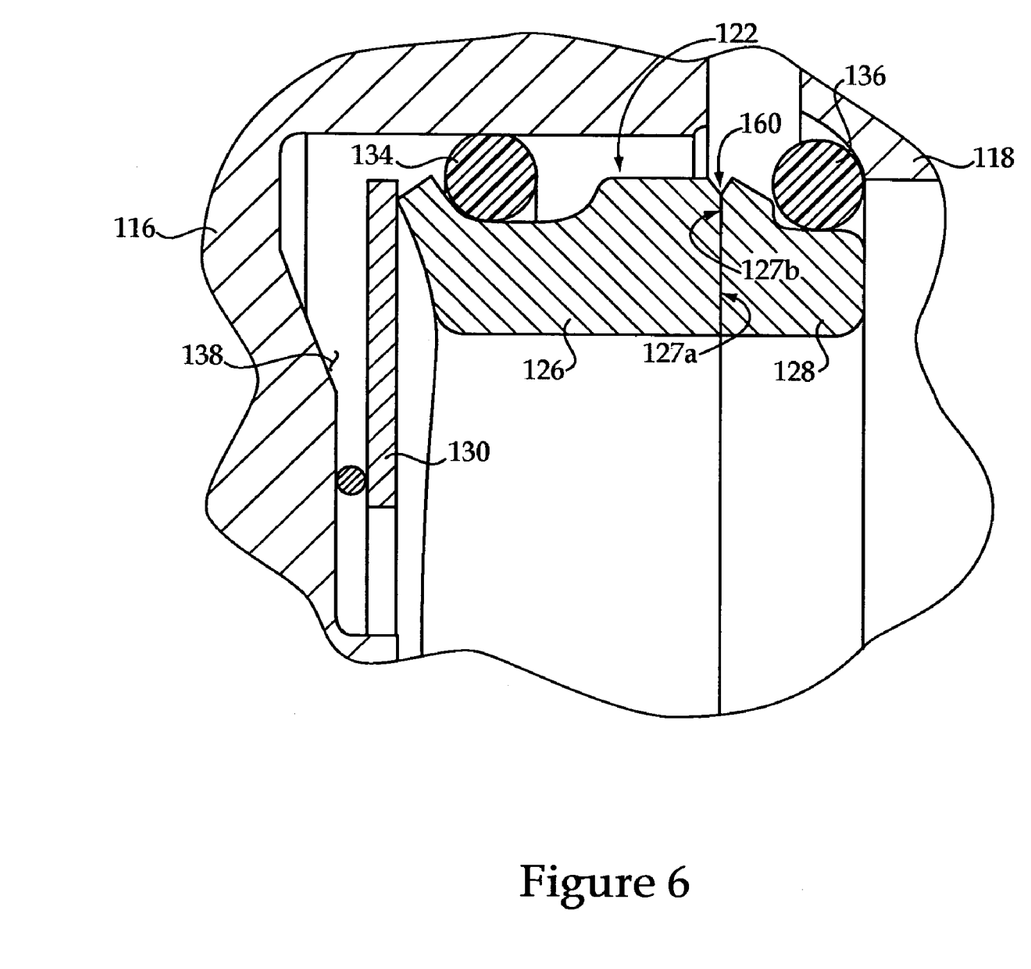
FIG. 6 is a sectioned side view of a portion of the machine system of FIG. 5.

Referring also to FIG. 6, there is shown a sectioned side view of portions of the components shown in FIG. 5, but in an assembled state rather than the exploded state shown in FIG. 5. It may be noted that inner seal member 126 includes a sealing face 127a whereas inner seal member 128 also includes a sealing face 127b, biased against sealing face 127a. Inner seal member 126 may be fixed to rotate with component 116 and inner seal member 128 may be fixed to rotate with component 118, such that faces 127a and 127b define a rotatable sealing interface 160 in a manner analogous to that described above with regard to seal assembly 22. Biaser 130 may be compressed to provide an axial biasing force on inner seal member 126 to bias faces 127a and 127b together at interface 160. Toric 134 may fluidly seal between component 116 and inner seal member 126, whereas toric 136 can fluidly seal between component 118 and inner seal member 128. It may also be noted in the embodiment of FIGS. 5 and 6 that only one biaser is used, in contrast to other embodiments described herein where biasers are used with each of two seal subassemblies. While embodiments are contemplated wherein each of the seal subassemblies are similar or substantially identical, seal assembly 122 illustrates that this need not be the case, as each of inner seal members 126 and 128 has a different cross-sectional shape.

Seal assembly 122 will function similarly to that of the other embodiments described herein, but may be axially stiffer. Toric 136, for example, can act as a stationary seal which does not roll or otherwise move substantially during assembly or operation of the associated machine. Where relatively less axial movement among or between components is acceptable or is desired, and in other instances such as where a lesser number of parts is desired, the embodiment of FIGS. 5 and 6 might be used. Seal assembly 122 still further differs from the other embodiments described herein in that biaser 130 is positioned within the fluid cavity 138 associated with seal assembly 122 and sealed via toric 134. Thus, biaser 130 may be understood as "inboard" of toric 134, relatively further from the end of cavity 138 closest to interface 160, and toric 134 may be understood as "outboard" of biaser 130, relatively closer to the end of cavity 138 closest to interface 160.

INDUSTRIAL APPLICABILITY

Returning to FIGS. 1-4, as mentioned above seal assembly 22 may be assembled/configured for use by moving subassemblies 29a and 29b axially against one another against a bias of biasers 30 and 32. In certain embodiments, seal assembly can take place during installation on a machine or machine system, for example during assembling wheel assembly 13. In other embodiments, seal assembly 22 may consist of a drop-in component, having some means for maintaining subassemblies 29a and 29b in an assembled configuration with faces 27a and 27b in contact despite biasing force from biasers 30 and 32 tending to urge them axially apart. Assembly of seal assembly 122 will generally take place in a manner similar to that of seal assembly 22, except that the parts may be assembled together against a biasing force of only the single biaser 130.

While the present description emphasizes seal assembly 22, it should be understood also to refer to seal assembly 122 except where otherwise indicated. During operation, sealing faces 27a and 27b will rotate against one another, maintaining fluid 41 within cavity 38. Biasers 30 and 32 can provide a desired face load at interface 60. Moreover, since biasers 30 and 32 are metallic, they can provide a relatively consistent face load over a working life of seal assembly 22. It may therefore not be necessary to compress biasers 30 and 32 greater than an optimum degree, as was often done in earlier designs wherein compressible torics provided the face load. Accordingly, seal assembly 22 may be capable of operating at relatively higher rotational speeds than certain earlier designs, as the face load at interface 60 may be set at a minimum acceptable face load rather than at or close to a maximum acceptable face load.

Splitting the face loading and sealing functions between separate components has the added advantage of enabling a relatively greater working distance which the components of subassemblies 29a and 29b may move relative to one another than was available with certain earlier designs. FIG. 4 illustrates a first axial distance $D_1$ and a second axial distance $D_2$. Axial distances $D_1$ and $D_2$ correspond to relative distances between inner and outer seal members 26, 28 and 24, 18, respectively, in a relatively less compressed configuration versus a relatively more compressed configuration. A difference between distances $D_1$ and $D_2$ defines a working distance for seal assembly 22 in at least certain embodiments. In other words, a relative separation in an axial direction between outer seal member 24 and inner seal member 26 may be a first distance $D_1$ when components of seal assembly 22 are urged apart by a load having an axial component. This state might exist, for example, where wheel 19 hits a rock, rut, etc. that imparts a tendency for components of seal assembly 22 to spread apart. A relative separation in the axial direction may be the second distance, $D_2$, when components of seal assembly 22 are urged together by a load having an opposite axial component, such as where wheel 19 hits another rock, rut, etc. When no substantial axial loads are applied, components of seal assembly 22 may be separated by a distance somewhere between distances $D_1$ and $D_2$.

As discussed above, overloading compressible torics in earlier designs to accommodate reduction in their resiliency over time may be associated with relatively small working distances for an associated seal assembly. In other words, because the torics which provided the face load were typically highly compressed to account for expected decay in the face load over time, the "play" between the seal components was less than what might be considered optimal. It is generally desirable for seal assemblies to have a working distance corresponding to expected or allowable movement between machine components coupled with the seal assembly during machine operation. Enabling a relatively large working distance by separating the face loading and sealing functions into separate components, as in the present design, thus provides greater flexibility in design and potentially improved robustness. Certain machines such as off-highway trucks, of which machine 10 may be one example, operate in relatively rugged environments, and accordingly wheel components and the like of such machines often are deflected relative to one another, making a seal having a relatively large working distance desirable.

Yet another advantage of separating the face loading and sealing functions via the use of metallic springs for biasers 30 and 32 is that they may have a constant loading curve over the working distance. Biasers 30 and 32 provide a relatively consistent face load at interface 60 regardless of whether subassemblies 29a and 29b are in a first configuration corresponding for example to distance $D_1$ or a second configuration corresponding to distance $D_2$. In other words, the spring force of biasers 30 and 32 does not tend to change substantially where biasers 30 and 32 are compressed/uncompressed during moving subassemblies 29a and 29b through their working distance. This contrasts with, for instance, compressible seal members used to provide the face loading in earlier designs.

Where compressible seals provide the face loading function in a metal face seal assembly, the compressible seals can have a relatively non-constant loading curve, exerting a widely varying face load at relatively small differences in the degree of compression of the compressible seals. This phenomenon can result in variations in seal performance among ostensibly identical seal assemblies, as variations among component dimensions or in the manner in which they are assembled can result in a range of seal compression states in different seal assemblies. In other words, the use of compressible seals can result in some seals which are relatively readily moved through a working distance, and other seals which are relatively more difficult to move through their working distance, given the variations among the face loads exerted by the different compressible seals. The present disclosure overcomes these problems. In some embodiments according to the present disclosure, biasers may be used which have a change of less than 10% in face load exerted over a working distance of about 7 millimeters. This relatively flat or constant loading curve can also reduce concerns regarding tolerance stack-up, resulting in more predictable performance. The cylindrical shapes of components of seal assembly 22 are also relatively easier to machine to relatively precise tolerances than conical surfaces used in conventional seal assemblies.

In certain of the embodiments shown and described herein, biasers 30 and 32 can provide the added benefit of protecting torics 34 and 36 from debris, water, etc. To shield torics 34 and 36, biasers 30 and 32 may be positioned outboard of torics 34 and 36, respectively, as shown. Biasers 30 and 32 may also be positioned such that they do not contact torics 34 and 36, but might abut them in other embodiments.

The present description is for illustrative purposes only and should not be construed to narrow the breadth of the present disclosure in any way. Thus, those skilled in the art will appreciate that various modifications might be made to the presently disclosed embodiments without departing from the full and fair scope of the present disclosure. In other embodiments, biasers 30 and 32 might be positioned inboard of torics 34 and 36, respectively, and within fluid cavity 38. Other aspects, features and advantages will be apparent upon an examination of the attached drawings and appended claims.

What is claimed is:

1. A metal face seal assembly for sealing between components in a machine comprising:
   a first subassembly including an inner seal member having a sealing face and an outer seal member positioned about and spaced radially outer from said inner seal member; and
   a second subassembly rotatable relative to said first subassembly and also including an inner seal member having a sealing face and an outer seal member positioned about and spaced radially outer from the respective inner seal member;
   said metal face seal assembly having a longitudinal axis, and said subassemblies each having a non-metallic compressible seal directly contacting the corresponding inner and outer seal members, and generating a sealing load in a non-axial direction to fluidly seal between the corresponding inner and outer seal members; and
   said subassemblies each metal further including a metallic biaser separate from said compressible seals and directly contacting the corresponding inner and outer seal members, each of the metallic biasers being compressed between the corresponding inner and outer seal members, and generating a face load in an axial direction to bias the sealing faces of said inner seal members together at a rotatable interface.

2. The metal face seal assembly of claim 1 wherein said longitudinal axis comprises an axis common to said subassemblies, and wherein said biasers each include a one-piece annular biaser urging the inner and outer seal members of the corresponding subassembly in opposite directions along said axis.

3. The metal face seal assembly of claim 2 wherein the inner and outer seal members of each of said subassemblies are movable relative to one another a working distance along said axis, and wherein said biasers each have a constant loading curve over said working distance.

4. The metal face seal assembly of claim 3 wherein at least one of said biasers comprises a Belleville spring.

5. The metal face seal assembly of claim 2 wherein each of said biasers is positioned outboard of the compressible seal of the corresponding subassembly and does not contact the compressible seal of the corresponding subassembly.

6. The metal face seal assembly of claim 5 wherein at least one of the inner seal member and outer seal member of each of said subassemblies includes a locating groove for the corresponding compressible seal.

7. The metal face seal assembly of claim 2 wherein:
   each of said inner seal members includes a regular cylindrical outer diameter and each of said outer seal members includes a regular cylindrical inner diameter concentric with and parallel to the outer diameter of the corresponding inner seal member;
   said subassemblies each including a fluid cavity between the respective inner and outer seal members; and
   each of said compressible seals comprises a toric positioned between the outer and inner diameters of the corresponding inner and outer seal members and fluidly sealing the corresponding fluid cavity.

8. The metal face seal assembly of claim 7 wherein:
each of said inner seal members comprises an annular shoulder whereupon the corresponding sealing face is located;
each of said outer seal members includes an end face; and
said biasers are operably disposed between the shoulder and end face of the corresponding outer and inner seal members.

9. A machine system comprising:
a first component;
a second component rotatable about an axis relative to said first component; and
a metal face seal assembly having a longitudinal axis and including a first subassembly coupled with said first component and a second subassembly coupled with said second component and rotatable relative to said first subassembly, said subassemblies each including an inner seal member having a sealing face and an outer seal member radially spaced from the inner seal member;
said subassemblies each include a non-metallic compressible seal positioned between and directly contacting their respective inner and outer seal members, each said compressible seal being in a seal compression state and generating a sealing load in a non-axial direction and fluidly sealing between said inner and outer seal members, and said subassemblies each including a metallic biaser separate from said compressible seals and directly contacting the inner and outer seal members, said metallic biaser having a spring force and generating a face load in an axial direction biasing the sealing faces of said inner seal members together at a rotatable interface; and
wherein each of said subassemblies are in a first axially compressed configuration and are adjustable to a second axially compressed configuration, and wherein the face load is defined by the spring force and decoupled from the seal compression state at each of the first and second axially compressed configurations.

10. The machine system of claim 9 wherein said inner seal members include coaxial bores, said machine further comprising a rotatable shaft component extending through said coaxial bores and fixed to rotate with said second subassembly, wherein each of said subassemblies includes a fluid cavity between the respective inner and outer seal members containing a lubricating fluid and communicating with said coaxial bores, and wherein said rotatable interface comprises a layer of said lubricating fluid between the respective sealing faces.

11. The machine system of claim 9 wherein each of said inner seal members includes a regular cylindrical outer diameter and each of said outer seal members includes a regular cylindrical inner diameter concentric with and parallel the outer diameter of the corresponding inner seal member.

12. The machine system of claim 9 wherein each of said biasers comprises a Belleville spring.

13. The machine system of claim 11 comprising a drive system for a machine, and wherein said first and second components comprise a hub component and a wheel component, respectively, of a wheel assembly.

14. The machine system of claim 10 wherein said biaser is positioned within the fluid cavity of the corresponding subassembly and does not contact the compressible seal of the corresponding subassembly.

* * * * *